US006401204B1

(12) United States Patent
Euchner et al.

(10) Patent No.: US 6,401,204 B1
(45) Date of Patent: Jun. 4, 2002

(54) PROCESS FOR CRYPTOGRAPHIC CODE MANAGEMENT BETWEEN A FIRST COMPUTER UNIT AND A SECOND COMPUTER UNIT

(75) Inventors: Martin Euchner, München; Volker Kessler, Vierkirchen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/194,678

(22) PCT Filed: May 16, 1997

(86) PCT No.: PCT/DE97/01002

§ 371 (c)(1),
(2), (4) Date: Dec. 1, 1998

(87) PCT Pub. No.: WO97/47109

PCT Pub. Date: Dec. 11, 1997

(30) Foreign Application Priority Data

Jun. 5, 1996 (DE) .......................... 196 22 631

(51) Int. Cl.$^7$ ................................. G06F 1/26
(52) U.S. Cl. ................. 713/169; 713/170; 713/171; 713/176
(58) Field of Search ................. 713/169, 170, 713/171, 176

(56) References Cited

U.S. PATENT DOCUMENTS 5,224,163 A 6/1993 Gasser et al.
6,081,508 A * 6/2000 West et al. ............ 370/238
6,182,142 B1 * 1/2001 Win et al. ............ 709/229
6,182,226 B1 * 1/2001 Reid et al. ............ 713/201

FOREIGN PATENT DOCUMENTS

DE 39 15 262 11/1989
EP 0 602 335 6/1994

OTHER PUBLICATIONS

Informatik–Fachberichte—Norbert Ryska et al—1980.
The Definition and Implementation of A Secure Communications Protocol—Chorley et al—1983 International Carnahan Conference Oct. 4–6, 1983.
Sicherheitsmechanismen für Rechnernetze Ekberg et al.
Sichere Kommunikationsnetz und deren Protokolle—Informationstechnik it 32 (1990)—Ledere et al.
The Berkom Multimedia Collaboration Service—Altenhofen et al—1993 ACMO–89791.

* cited by examiner

*Primary Examiner*—Thomas R. Peeso
(74) *Attorney, Agent, or Firm*—Schiff Hardin & Waite

(57) ABSTRACT

In a method for cryptographic code management between a first computer unit and a second computer unit, the method is divided into individual modular phases. Authentification references that are employed in further cryptographic phases are exchanged during an authentification of the first computer unit and the second computer unit. As a result thereof and due to the modular structure, a respectively new authentication actually required in the further cryptographic phases is no longer necessary and is also not implemented.

13 Claims, 2 Drawing Sheets

PROCESS FOR CRYPTOGRAPHIC CODE MANAGEMENT BETWEEN A FIRST COMPUTER UNIT AND A SECOND COMPUTER UNIT

BACKGROUND OF THE INVENTION

Given a communication between communication participants, it is necessary in many technical fields to secure the communication of the participants against any and all misuse with cryptographic methods. The expense that is required for a cryptographic securing of the entire communication is thereby dependent on the respective application. In private calls, for example, it is thus not especially significant under certain circumstances that all crytographically possible security measures be undertaken for securing the communication. Given communication with extremely confidential content, however, a very strict securing of the communication is, for example, of considerable significance.

The selection of security services, security mechanisms, security algorithms and security parameters for securing the communication is referred to as security policy that is adhered to during the communication between communication partners.

Since, however, the security needs and, connected therewith, the security policy differs from communication session to communication session and from application to application and since the communication participants do not in fact have all cryptographic methods available to them, serious discrepancies in the required or, respectively, possible security policy that is supported by the respective computer unit of the communication partner and can thus be assured can arise given frequently changing communication partners.

It is required that a uniform security policy for the respective communication is defined in every communication session within a group that participates in a communication session.

The problem arises in many different application protocols that are described, for example, in MMC overview article, for example CMAP, CDAP, etc., that different application protocols of the same or different computer units required a different security policy. Separate, specific cryptographic codes for the respective application protocol are also potentially required for a logical connection of the respective application protocol between two computer units. Since different application protocols can be implemented on one computer unit, a plurality of cryptographic codes may have to be exchanged between two computer units under certain circumstances. For this reason, it can also be necessary to negotiate a plurality of different security policies between two computer units.

A secure code exchange or a trustworthy negotiation of a security policy is based on a mutual authentification of the computer units involved in the negotiation or, respectively, in the code exchange be fore the actual code exchange or, respectively, the negotiation of the security policy.

An authentification phase in which the computer units mutually authenticate each other is usually implemented before every negotiation of a security policy or, respectively, before every code exchange.

Given a plurality of negotiations of security policy or code exchange procedures, this leads to a plurality of implemented authentifications that means an increased communication outlay and increased need for computing capacity.

This problem is even intensified when it is not only two computer units that communicate with one another but a plurality of computer units are provided that are assigned to different security domains. What is to be understood by a security domain in this context is a set of computer units that pursue a common security policy.

In this case, the authentification is usually implemented on the basis of the security domains.

An overview of generally employable cryptographic methods that can be utilized in the method can be found, for example, in S. Muftic, Sicherheitsmechanismen für Rechnernetze, Carl Hanser Verlag, Munich, ISBN 3-446-16272-0, pp. 34–70, 1992.

It is known to negotiate a security policy between two communication partners, whereby, however, the negotiation disclosed in this E. Kipp et al., The SSL Protocol, Internet Draft, available in the Internet in June 1995 at the following address: gopher://ds.internic.net:70/00/internet-drafts/draft-hickman-netscape-ssl-01.txt is limited to a few previously defined parameters.

SUMMARY OF THE INVENTION

It is an object of the invention to specify a method for code management between two computer units wherein the required communication expense and the computing capacity required for the implementation of the method is lower than in known methods.

According to the method of the present invention for cryptographic code management between a first computer unit and a second computer unit, an authentication is implemented between the first computer unit and the second computer unit. Authentification references with which authenticity of the computer unit is assured are exchanged between the first computer unit and the second computer unit during the authentification. A security policy is negotiated between the first computer unit and the second computer unit. At least one of the authentification references is employed in the negotiation of the security policy.

Given this method, an authentification is implemented between two computer units, authentification references being exchanged between the computer units in the framework thereof. A secret information with reference whereto an authentification of the computer units is possible is exchanged between the computer units together with the authentification references. A subsequent negotiation of a security policy and/or a subsequent code exchange between the computer units occurs upon employment of the authentification references.

As a result of this method, it is possible to avoid explicit authentification phases between the computer units for every new code exchange and/or for every new negotiation of security policy. Given a plurality of utilized application protocols, for example, this means a considerable reduction of required authentification phases, since the authentification only has to be implemented once between the computer units and the authentification of the computer units for all further steps occurs implicitly on the basis of the co-transmitted authentification references.

The communication expense between the computer units as well as the required calculating time is thus substantially reduced for a code management.

A further saving of required communication expense and required computing capacity is achieved given grouping of a plurality of computer units in security domains and an authentification of the computer units on the basis of the security domain that is respectively allocated to the computer unit. This is achieved by the modular structure of the method since an explicit authentification phase has to be implemented for respectively one computer unit of a security domain. When negotiations of a further security policy and/or a further code exchange between further computer units of the corresponding security domains for which a mutual authentification already occurred, the exchanged authentification references can be implicitly utilized in the further negotiation and/or the further code exchange for authentification of the further computer units.

In a development of the invention, further, it is advantageous to employ hash functions, since a formation of hash values can be implemented very fast upon employment of such hash functions. The implementation of the method is thus considerably speeded up.

A trustworthy, incontestable implementation of the method is possible by employing digital signatures in the method.

It is also advantageous to implement a connection cleardown phase (disconnect) within whose framework shared secrets, for example the exchanged code or the authentification references, are deleted. The security of the method is thus enhanced further since no exchanged, secret information are available to other computer units for potential, later misuse. The disconnect phase also serves for the synchronization of the computer units participating in the communication.

In a development of the method, it is advantageous to successively delete the secret information, so that a hierarchic re-employment of secret, previously exchanged information is possible, for example given further exchange of codes. This means, for example, that the session key exchanged for the logical connection is erased at the beginning of the disconnect phase but the security policy negotiated between the application protocols still remains stored. Given a following, new logical connection between the application protocols of the computer units, it is then only necessary to exchange a new key between the computers. The previously exchanged secret information, for example the authentification references or the negotiated security policy, can continue to be re-employed in the new logical connection.

The Figures show an exemplary embodiment of the invention, which is explained in greater detail below.

DESCRIPTION OF THE PREFERRED EMBODIMENTS

In the framework of this invention, the term 'cryptographic method' is to be understood in a way that both all cryptographic methods as well as the non-cryptographic methods for the integrity check of the data packet DP, for example the cyclic redundancy check (CRC), are referenced with the term 'cryptographic method'.

Figure 1:
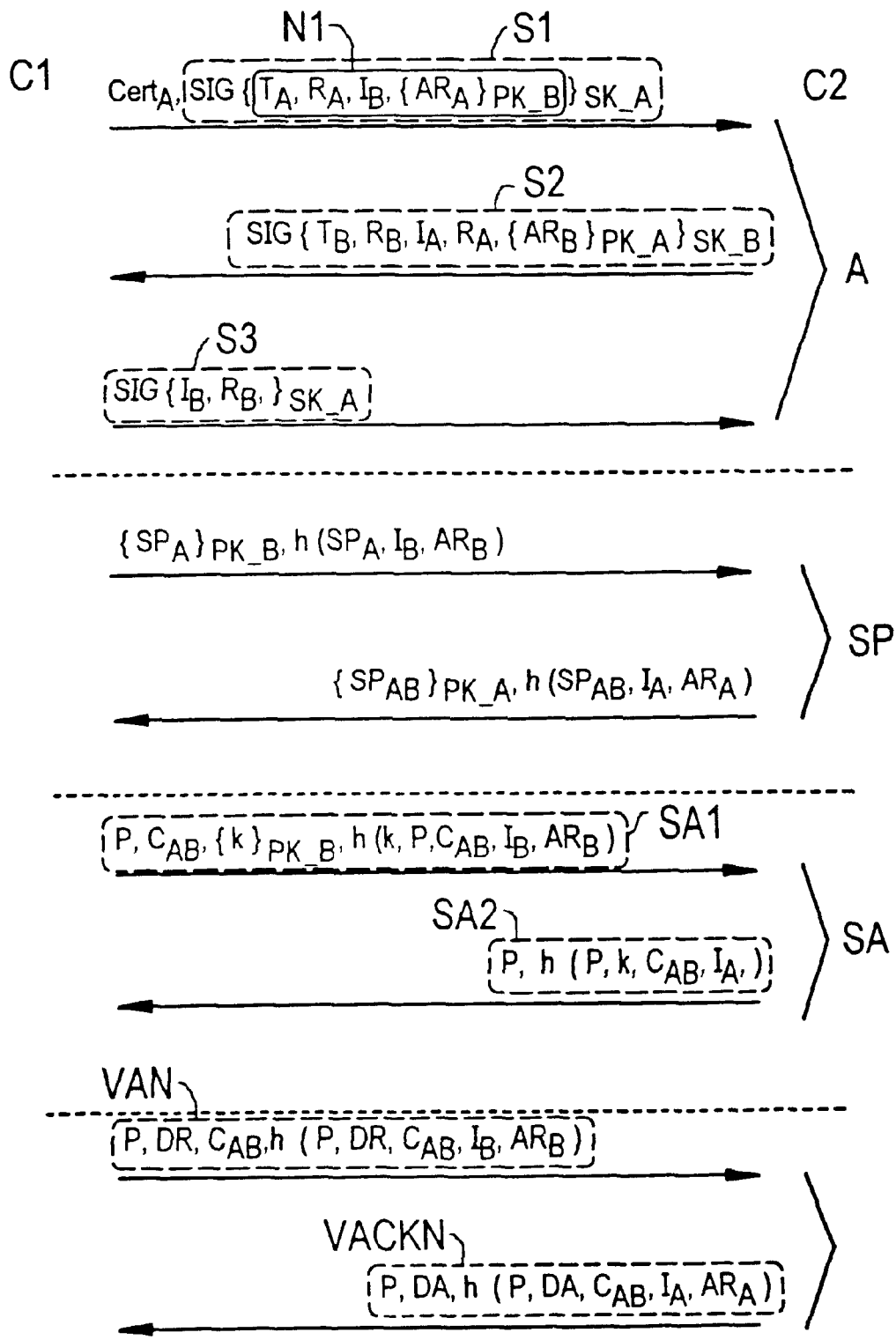
FIG. 1 is a flowchart in which the individual method steps of the method are shown.

FIG. 1 shows an example of the method with reference to which the invention is presented. As explained below, this exemplary embodiment is in no way to be understood as the exclusive way of realizing the invention. Modifications of the exemplary embodiment in terms of the individual method steps are known to a person skilled in the art and are explained in the course of the further description.

At the beginning of the method, an authentification is implemented between a first computer unit C1 and a second computer unit C2. The authentification occurs in an authentification phase A.

For example, the authentification can occur in the method for strong authentification described in the X.509 standard. For example, the authentification is thereby implemented in the following way.

A first certificate $Cert_A$ that contains a trustworthy public key certified by a trustworthy third instance, the certification unit, is transmitted from the first computer unit C1 to a second computer unit C2.

In addition to the first certificate $Cert_A$, the first unit also forms a first signature message S1 that is formed by a digital signature over a first message N1 with a secret key SK_A of the first computer unit C1.

For example, the first message N1 contains a first time stamp $T_A$, a first random number $R_A$, an identity particular $I_B$ of the second computer unit, for example the unambiguous identity indication of the second computer unit C2 given employment of the X.509 authentification mechanism, a domain indication SDID allocated to the second computer unit C1 given a negotiation (described below) of a security policy to be employed that extends over an entire security domain, as well as an authentification reference $AR_A$ of the first computer unit C1 that is encrypted with a public key PK_B of the second computer unit C2 that corresponds to a pseudo-key of the first computer unit C1.

The first certificate $Cert_A$ as well as the first signature message S1 is transmitted to the second computer unit C2.

After evaluation (verification) of the first signature message S1, which serves for repelling cryptographic attacks of various types, a second signature message S2 is formed in the second computer unit and transmitted to the first computer unit.

The second signature message S2 contains, for example, the following components:

a second time stamp $T_B$, a second, unambiguous random number $R_B$, an identity particular $I_A$ of the first computer unit C1, the first random number $R_A$, an authentification reference $AR_B$ of the second computer unit C2 encrypted with a public key PK_A of the first computer unit C1.

The above-described components form a second message N2 that is determined by formation of a digital signature upon employment of a secret key SK_B of the second computer unit C2.

During the further protocol execution, the secret pseudo-keys in function of the authentification reference $AR_A$ of the first computer unit C1 and the authentification reference $AR_B$ of the second computer unit C2 serve for cryptographically coupling following protocol phases and protocol messages to the authentification phase. Given employment of the X.509 standard, the authentification reference $AR_A$ of the first computer unit C1 can be transmitted in a field that is provided for a "secret bit string".

After reception and evaluation, i.e. verification of the second signature message S2 in the first computer unit C1, the first computer unit C1 forms a third signature message S3 and transmits it to the second computer unit C2.

The third signature message S3 is formed upon employment of the secret key SK_A of the first computer unit C1 with which a third message N3 is encrypted. The third message N3 contains at least the identity particular $I_B$ of the second computer unit as well as the second random number $R_B$.

The authentification, however, can occur by any other authentification between the first computer unit C1 and the second computer unit C2, for example upon employment of the principle of exponential key exchange, for example upon employment of what is referred to as the Diffie-Hellmann method. Given employment of the Diffie-Hellmann key exchange, the exchanged key is directly employed as the authentification references $AR_A$, $AR_B$ employed in the further method.

The only thing required in the authentification phase A is that the authentification references $AR_A$, $AR_B$ are exchanged in a trustworthy way between the first computer unit C1 and the second computer unit C2. In the two computer units C1, C2, this means that it is only necessary that a secret information characteristic of the respective computer unit C1, C2 is present in the respectively other computer unit C1, C2 after the authentification phase A.

After the authentification has occurred, a security policy utilized in the further communication phase is negotiated between the first computer unit C1 and the second computer unit C2 and/or cryptographic keys are exchanged.

Both a negotiation phase SP of the security policy as well as a key exchange phase SA are described in detail below. In modifications of the method, however, it is provided to implement only the negotiation phase SP of the security policy or the key exchange phase SA. The common presentation of the two phases SP, SA in the exemplary embodiment serves only for a clearer presentation of the invention.

The negotiation phase SP of the security policy can, for example, be characterized by the following method steps.

A mutual authentification of the first computer unit C1 and the second computer unit C2 for further negotiations of the security policy between the first computer unit C1 and the second computer unit C2 becomes possible with this modularly constructed protocol without having to implement the authentification phase A anew. This becomes possible by employing the authentification references $AR_A$, $AR_B$ for the implicit authentification of the computer units C1, C2 in the negotiation phase SP of the security policy.

In one development, for example, the security policy can extend over entire security domains S1, S2, this referencing a group of computers that subject themselves to a common security policy.

The security policy, however, can also only extend to the connection to be currently set up between the first computer unit C1 and the second computer unit C2.

A security policy proposal $SP_A$ that contains the security policy to be employed that is proposed by the first computer unit C1 is formed in the first computer unit C1.

The security policy proposal $SP_A$ is encrypted with the public key PK_B of the second computer unit C2, as a result whereof the sensitive security policy proposal $SP_A$ is protected against an unauthorized listening.

Further, a hash function h(.) with which a first hash value $h(SP_A, I_B, AR_B)$ is formed is applied at least to the security policy proposal $SP_A$ the identity particular $I_B$ of the second computer unit C2 as well as the authentification reference $AR_B$ of the second computer.

The authenticity of the first computer unit C1 as well as of the security policy proposal $SP_A$ is assured for the second computer unit C2 with the first hash value $h(SP_A, I_B, AR_B)$.

At this point, it is possible to employ an asymmetrical digital signature, as a result whereof an incontestability of the respective digitally signed message is achieved.

The formation of a hash value on the basis of symmetrical crypto methods exhibits the advantage that the determination of the hash value with symmetrical crypto methods can be implemented significantly faster than the formation of a digital signature.

Arbitrary hash functions can be utilized in the framework of this method, for example the MD4 method, the MD5 method or the hash algorithm ISO10118. The hash method ISO10118 can be especially advantageously utilized when a hardware implementation of what is referred to as the symmetrical DES encryption method (data encryption standard) is present.

The encrypted security policy proposal $SP_A$ as well as the first value $h(SP_A, I_B, AR_B)$ are transmitted to the second computer unit C2 and verified thereat.

As a reply, a security policy confirmation $SP_{AB}$ is transmitted to the first computer unit C1, this being encrypted with the public key PK_A of the first computer unit C1. Further, a second hash value $h(SP_{AB}, I_A, AR_A)$ is formed in the second computer unit C2 and transmitted to the first computer unit C1, whereby the second hash value $h(SP_{AB}, I_A, AR_A)$ is formed at least over the security policy confirmation $SP_{AB}$, the identity particular $I_A$ of the first computer unit C1 as well as the authentification reference $AR_A$ of the first computer unit C1.

The security policy confirmation $SP_{AB}$ contains, for example, either a confirmation of the acceptance of the security policy proposal $SP_A$ sent by the first computer unit C1 or, on the other hand, its own security policy proposal formed by the second computer unit C2. When the security policy proposal formed by the second computer unit C2 deviates from the security policy proposal $SP_A$ of the first computer unit C1, then the first computer unit C1 must process, verify, check the further security policy proposal in a corresponding way and send a further security policy confirmation to the second computer unit C2.

The contents of the message correspond to the above-described method. The negotiation phase SP of the security policy can be iteratively continued until the first computer unit C1 and the second computer unit C2 have "agreed" to a uniform security policy supported by both computer units C1, C2.

The key exchange phase SA can be realized, for example, by the following method steps.

The first computer unit C1 transmits a first key exchange message SA1 to the second computer unit C2.

For example, the first key exchange message SA1 contains the following components:

a specification P of a connection to be employed with which one of a plurality of different, simultaneously active connections is represented;

a count value $C_{AB}$ of the first computer unit C1 for the key distribution and/or a connection abort message;

a session key k to be employed in the further method that is encrypted with the public key PK_B of the second computer unit, whereby the session key k is advantageously a symmetrical session key that is utilized in the framework of the connection P;

a third hash value $h(k, P, C_{AB}, I_B, AR_B)$ that is formed at least over the session key k, the connection P, the count value $C_{AB}$, the identity particular $I_B$ of the second computer unit C2 as well as the authentification reference $AR_B$ of the second computer unit C2.

It is likewise provided in a development of the method that the session key k is an asymmetrical key pair.

The count value $C_{AB}$ between the first computer unit C1 and the second computer unit C2 serves the purpose of distinguishing between different protocol runs for the same connection P between the first computer unit C1 and the second computer unit C2. In that the respectively received count value $C_{AB}$ must always be greater than the most recently stored count value $C_{AB}$, replay attacks, i.e. attacks by replaying tapped data, can be discovered.

The first key exchange message SA1 is verified by the second computer unit C2 on the basis of the third hash value $h(k, P, C_{AB}, I_B, AR_B)$, the session key k is deciphered upon employment of the secret key SK_B of the second computer, and a second key exchange message SA2 is formed with which the reception and the further employment of the session key k for the connection P of the first computer unit C1 is confirmed.

For example, the second key exchange message Sa2 contains the following components:
the connection P,
a fourth hash value $h(P, k, C_A, I_A)$ that is formed at least over the connection P, the session key k, the first count value $C_A$, as well as the identity particular $I_A$ of the first computer unit C1.

In this way, it is possible to quickly and reliably exchange the session key to be employed between the first computer unit C1 and the second computer unit C2 in a simple way without having to repeat the mutual authentification phase and the negotiation of the security policy SP.

This is only possible on the basis of the modular structure of the above-described method since individual phases of the method can be omitted or combined with one another in an arbitrary way given the modular structure.

It is also provided in a development to also secure a connection abort in a cryptographic way. For example, this can occur in that a connection abort message VAN is formed by the first computer unit C1 and sent to the second computer unit C2.

For example, the connection abort message VAN contains the following components:
the connection P,
a particular for the identification of the connection abort message VAN,
the count value $C_{AB}$,
a fifth hash value $h(P, DR, A_B, I_B, AR_B)$ that, for example, is formed over the connection P, the specification DR of the call abort message VAN, the count value $C_{AB}$, the identity particular $I_B$ of the second computer unit C2 and the authentification reference $AR_B$ of the second computer unit C2.

The connection abort message VAN is verified by the second computer unit C2, the connection is aborted and, for example, a connection abort acknowledge message VACKN is formed in the second computer unit C2 and transmitted to the first computer unit C1.

The connection abort acknowledge message contains, for example, the following components:
the connection P,
a particular DA for the identification of the connection abort acknowledge message VACKN,
a sixth hash value $h(P, DA, C_{AB}, I_A, AR_A)$ that is formed, for example, over the connection P, the particular DA for the identification of the connection abort acknowledge message VACKN, the count value $C_{AB}$, the identity particular $I_A$ of the first computer unit C1 as well as the authenticity reference $AR_A$ of the first computer unit C1.

With the particulars DR, DA for the identification of the connection abort message VAN or, respectively, of the connection abort acknowledge message VACHN, it is possible to prevent misuse of the hash values for other purposes given future expansions of this above-described method. The connection abort message VAN and/or the connection abort acknowledge message VACKN additionally contain the particular about the connection P employed.

The above-described phases (shown in FIG. 1) of the method for the authentification A, for the negotiation SP of the security policy proposal, for the key exchange SA as well as for the connection abort can be implemented in an arbitrary combination with one another.

It is provided in a development of the method that all secretly exchanged information are not immediately deleted in the connection abort phase but that only the respectively exchanged session key k is initially deleted and, for example, the negotiated security policy and/or the authentification references $AR_A$, $AR_B$ remain stored in the computer units C1, C2.

It is also provided in a development to delete the deletion of the shared, secret information successively, i.e. to first delete the respectively negotiated security policy after deletion of the session key k and to not delete the authentification references $A_{RA}$, $AR_B$ until thereafter.

The method can be implemented during a connection setup phase or, respectively, during a connection setup phase of a connection between the first computer unit C1 and the second computer unit C2.

Figure 2:
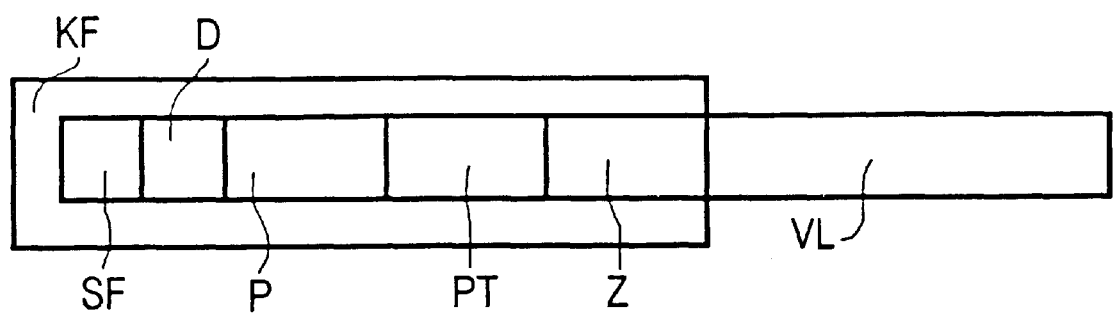
FIG. 2 is a sketch of a message format in which the messages exchanged in the method can be advantageously transmitted.

It is provided in a development of the method to transmit the individual messages in a message format whose structure is shown in FIG. 2.

Given this message format, the messages to be respectively transmitted are preceded by a header field KF.

The message format described below is not limited in any way whatsoever to the above-described method but can be employed in all cryptographic protocols.

The header field KF preferably comprises the following elements:
a security flag SF having the length of at least one bit;
the connection P;
a phase specification PT of a phase A, SP, SA to which the respective information of the message relates;
a counter field Z with which the message respectively within the respective phase A, SP, SA is unambiguously identified;
a particular, for example an address, to which the computer unit C1, C2 receiving the message is allocated and/or a specification of the security domain S1, S2 to which the respective computer unit C1, C2 is allocated.

In one development, at least one particular about algorithms, for example RSA, MD5, MD4, DES, elliptical curve algorithms to be employed in the phase A, SP, SA and/or parameters to be employed in the algorithms, can be additionally contained in the header field KF, for example in the field PARTICULARLY as well in which the respective phase A, SP, SA is indicated.

As a result of the security flag SF, which comprises the length of at least one bit, it is possible for the receiver—in the evaluation of the header field KF—to recognize in a very simple, fast way that thus, saves computing capacity whether the respectively received message has been cryptographically handled in some way or other.

The particular in the security flag SF with a first logical value for a cryptographically processed message and a second logical value for a message that was not cryptographically processed suffices therefor.

For this reason, it is provided in a development that the security flag only comprises the length of exactly one bit.

One advantage of the counter field Z is to be seen therein that arbitrarily many messages can fundamentally be exchanged in a phase A, SP, SA, and the respective message within the phase A, SP, SA can be unambiguously identified with the counter field Z.

One advantage of the phase indication PT of the phase A, SP, SA in the header field KF is to be seen in the very simple expandability of the entire method by new phases, whereby a new designation merely has to be incorporated into the phase indication PT. Replacing and/or deleting phases that have already been provided is also just as easily possible with the phase indication PT.

The message itself is contained in a variable-length field VL.

Although various minor changes and modifications might be proposed by those skilled in the art, it will be understood that our wish is to include within the claims of the patent warranted hereon all such changes and modifications as reasonably come within our contribution to the art.

We claim:

1. A method for cryptographic code management between a first computer unit and a second computer unit, comprising the steps of:
    implementing an authentification between the first computer unit and the second computer unit;
    exchanging authentification references with which authenticity of the computer unit is assured between the first computer unit and the second computer unit during the authentification;
    negotiating a security policy between the first computer unit and the second computer unit; and
    employing at least one of the authentification references in the negotiation of the security policy.

2. The method according to claim 1 including the further steps of:
    implementing a key exchange between the first computer unit and the second computer unit; and
    employing at least one of the authentification references in the key exchange.

3. The method according to claim 2, including the steps of:
    allocating the first computer unit to a first security domain;
    allocating the second computer unit to a second security domain;
    implementing a further key exchange by further computer units of the first security domain or of the second security domain; and
    employing the authentification references in the key exchange.

4. The method according to claim 1, including the steps of:
    allocating the first computer unit to a first security domain;
    allocating the second computer unit to a second security domain;
    negotiating a further security policy by further computer units of the first security domain or of the second security domain; and
    employing the authentification references in the negotiation.

5. The method according to claim 1 including the step of employing hash functions based on symmetrical crypto algorithms in the method.

6. The method according to claim 1 including the step of employing digital signatures in the method.

7. The method according to claim 1 including the step of implementing the authentification according to a strong authentification of an X.509 method.

8. The method according to claim 1 including the steps of:
    implementing the authentification according to a Diffie-Hellman method for key exchange; and
    wherein the keys exchanged according to the Diffie-Hellman method are employed as authentification references.

9. The method according to claim 1 including the step of implementing a connection cleardown phase within a framework of which shared secrets are deleted.

10. The method according to claim 9 wherein an exchanged key is deleted.

11. The method according to claim 10 wherein further secrets are subsequently successively deleted.

12. The method according to claim 9 wherein the authentification references are deleted.

13. A method for cryptographic code management between a first computer unit and a second computer unit, comprising the steps of:
    implementing an authentification between the first computer unit and the second computer unit;
    exchanging authentification references with which authenticity of the computer unit is assured between the first computer unit and the second computer unit during the authentification;
    negotiating a security policy between the first computer unit and the second computer unit, and implementing a key exchange; and
    employing at least one of the authentification references in the negotiation of the security policy and in the key exchange.

* * * * *